May 17, 1960  V. LANGEN  2,937,034
GAS-HYDRAULIC SPRING SUSPENSION FOR VEHICLES
Filed Oct. 2, 1957
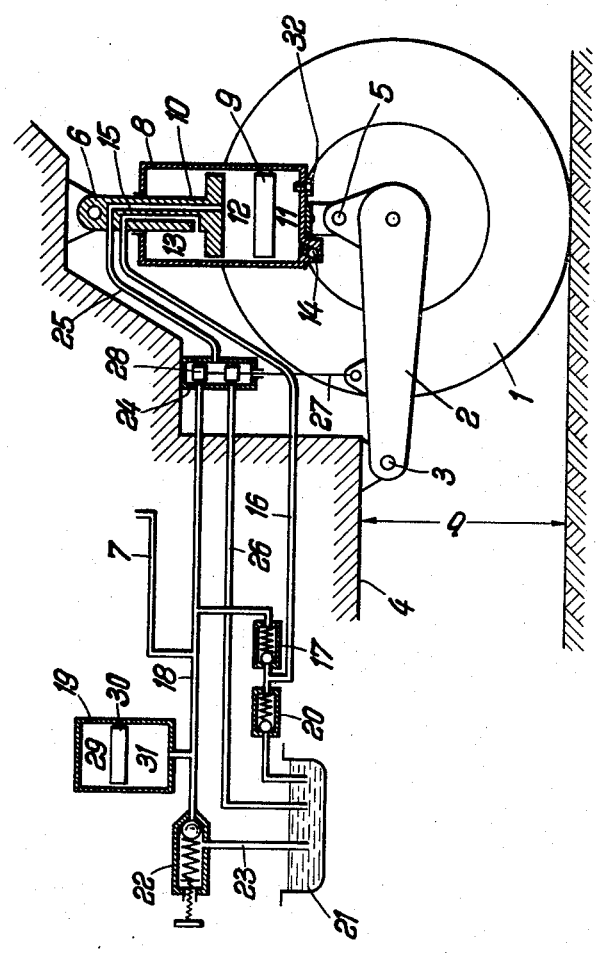

United States Patent Office 2,937,034
Patented May 17, 1960

2,937,034

GAS-HYDRAULIC SPRING SUSPENSION FOR VEHICLES

Viktor Langen, Dusseldorf-Meererbusch, Germany, assignor to Langen & Co., Dusseldorf, Germany Application October 2, 1957, Serial No. 687,758

Claims priority, application Germany October 12, 1956

8 Claims. (Cl. 280—124)

The invention relates to gas-hydraulic spring means. The advantage of air springs is that they have a variable rate. This type of spring means is therefore increasing in popularity in the construction of vehicles.

For increasing the riding comfort of a vehicle it has already been proposed to combine an air spring with a hydraulic element in such a way that instead of acting directly upon the air spring the suspended wheel transmits the load indirectly to the air cushion through a hydraulic medium.

In an air-hydraulic spring of this kind the wheel shocks are absorbed by the pneumatic element. The hydraulic component merely serves to transmit the forces from the wheel through a piston to the air cushion and at the same time to provide adjusting means which take effect by admitting and withdrawing hydraulic fluid, for the purpose of maintaining the road clearance whatever the load and of keeping the vehicle level on lateral and longitudinal slopes.

To take advantage of these possibilities a pump of sufficient capacity must be provided for moving the hydraulic medium. Such a pump is expensive, besides consuming considerable power and introducing a source of possible trouble.

The aim of the present invention is to simplify gas-hydraulic spring means and to avoid the above mentioned drawbacks.

An illustrative embodiment of the invention is exemplified in the accompanying drawing.

This drawing shows the running wheel 1 of a vehicle, which is suspended at the end of a control arm 2 fulcrumed at 3 on the vehicle underframe 4, the latter being represented by a simple schematic outline. The spring means between the wheel 1 and the underframe 4 comprises a cylinder 8, linked to the control arm 2 by means of a pivot pin 5, and a piston 10 slidably disposed in the cylinder 8 and similarly linked to the underframe 4 by means of a pivot pin 6. Between piston 10 and the opposite end of cylinder 8 is a fully floating free piston 9. The end wall of cylinder 8 contains a gas inlet 14, normally closed by a non-return valve fitted therein, as well as a drain plug 32.

A duct 15 is axially drilled through the piston and its piston rod 10 and communicates with a pipe line 25 outside the cylinder 8. This pipe 25 terminates in a valve 24 which is in turn connected with two pipes 18 and 26. These two pipes 18 and 26 can be closed by two pistons 28 which are actuated by a rod 27 linked to the control arm 2.

Pipe 18 communicates with an air-accumulator 19 in which a free piston 30 separates a precompressed volume of gas 29 from a chamber 31 which contains oil and which is connected with the said pipe 18. The latter also incorporates a non-return valve 22 which permits oil from pipe 18 and the accumulator 19 to be discharged through a pipe 23 into an oil sump 21. This oil sump 21 may be embodied in a sealed container and thus establish a completely self-contained oil system. Valve 22 is manually controllable. Conveniently the valve control means are on the vehicle dashboard. By adjusting valve 22 the shock absorbing effect of spring means 8 to 12 can be adapted to the speed, the condition of the road surface, and the loaded weight of the vehicle. Pipe 26 communicates directly with the oil sump 21.

The end of cylinder 8 remote from the gas chamber 11 has a pipe connection 16 with the oil sump 21. Through this pipe oil can either be withdrawn from the oil sump through a non-return valve 20 or oil displaced into pipe 18 through a second non-return valve 17.

The described system functions as follows:

When the vehicle is stationary the two pistons 9 and 10 enclose a volume of oil which is determined by the setting of valve 24. This oil volume in turn determines the clearance $b$ of the vehicle above the surface of the road. When the vehicle is loaded the gas cushion 11 will be compressed and its volume reduced. At the same time valve 24 will be opened and permit oil to flow from accumulator 19 through channels 18, 25 and 15 into chamber 12 until the underframe is again raised to its original level. When the original road clearance is re-established valve 24 will close again and the further admission of oil into chamber 12 will then cease.

Now assuming that the wheel 1 suddenly rises by encountering a bump in the road, then the resultant shock will be absorbed in the gas cushion 11. The volume of oil in chamber 12 will remain unchanged because, although valve 24 will actually open for the brief duration of the rise and fall of the wheel, the time is too short for a significant quantity of oil to be transferred through channels 18, 25 and 15 from the accumulator 19 to chamber 12. However, if the rise and fall of the wheel is slow, there will be some displacement of oil from the accumulator 19 to chamber 12 and then back again.

Owing to the reciprocation of piston 10 oil will be drawn into chamber 13 through pipe 16 via the non-return valve 20 and then forced back through pipe 16 via non-return valve 17 into pipe 18, and hence to the accumulator 19. Chamber 13 in cylinder 8 in conjunction with piston 10 therefore functions in the manner of a displacement pump which displaces the oil required to fill chamber 12. The ratio of the two piston faces in chambers 12 and 13 respectively is so chosen that the pressure generated in chamber 13 will by a sufficient margin exceed the pressure in chamber 12 to ensure that the pressure in pipe 18 and in the accumulator 19 will certainly be high enough to fill chamber 12 with oil. Pipe 7 which is shown as a pipe branching from pipe 18 connects up with other facilities requiring hydraulic power, such as windscreen wipers, power-assisted steering equipment, and so forth. This connection is provided in case the energy generated in chamber 13 should substantially exceed the energy requirement of the spring.

Leakage loss between chambers 12 and 13 does not affect the functioning as a control element of chamber 12 and as a pump element of chamber 13, because both elements are included in the same hydraulic circuit. Leakage loss in the system is therefore self-compensating.

In the illustrated embodiment the generation of a gas cushion of sufficient pressure in chamber 11 is comparatively simple. After the vehicle has been jacked up the two pistons 9 and 10 are pushed into their upper positions and all liquid is displaced from the two chambers 12 and 13. Gas can then be pumped in through inlet 14 at a pressure which can be easily produced by conventional pumps, any leakage oil having been previously drained by the temporary removal of plug 32. Defects or faults which may arise in the air spring can therefore be remedied by performing a few simple manipulations whereas in known devices the entire assembly or at least the pneumatic element had to be removed and replaced in such cases. After the gas cushion has been created the hydraulic pressure medium is admitted from the accumulator 31 into chambers 12 and 13 and the desired high gas pressure in chamber 11 thereby established. A valve 14 incorporated in the inlet of the gas chamber can be used to adjust the gas pressure as may be required.

The drawing illustrates the system associated with only one wheel. It will be readily understood that in a system serving a vehicle the accumulator 19, the oil sump 21, and the overload valve would be common to all the wheels of the vehicle. By incorporating appropriate control elements or other devices in the spring system lateral tilt when negotiating a curve and fore and aft throw when applying the brakes or when accelerating can be avoided.

What we claim is:

1. A gas-hydraulic suspension for vehicles comprising a cylinder and piston device, one of the cylinder and piston being connected to the suspended part and the other to the suspending part of the vehicle, the piston having one face determining with one end of the cylinder a first chamber of variable volume having therein a body of gas acting on said one end and a column of liquid determining the pressure of said body, a rod for said piston extending through the other end of said cylinder, the other face of said piston defining with said other end a second chamber, a duct system connecting said second chamber to said column, a non-return valve in said system delivering toward said column, a slide valve operatively associated with said suspended part and in said duct system with said non-return valve and said column, a fluid supply, a duct connecting said fluid supply to the intake of said non-return valve, and a further non-return valve in said duct delivering toward the first said non-return valve.

2. A suspension as in claim 1 further comprising an accumulator containing liquid under pressure connected to the duct system intermediate said column and the first said valve.

3. A suspension as in claim 2 in which said slide valve controls the supply of liquid from the accumulator to the column.

4. A suspension as in claim 1 further comprising an accumulator connected to the duct system, said slide valve controlling the connection of the column selectively to the accumulator at high pressure and to the supply at low pressure.

5. A suspension as in claim 1 wherein the duct system is positioned outside the cylinder.

6. A gas-hydraulic suspension for vehicles comprising a cylinder and piston device, one of the cylinder and piston being connected to the suspended part and the other to the suspending part of the vehicle, the piston having one face determining with one end of the cylinder a first chamber of variable volume having therein a body of gas acting on said one end and a column of liquid determining the pressure of said body, a rod for said piston extending through the other end of said cylinder, the other face of said piston defining with said other end a second chamber, a duct system connecting said second chamber to said column, a non-return valve in said system delivering toward said column, a valve operatively connected with said suspended part and between said non-return valve and said column, a fluid supply, a duct connecting said fluid supply to the intake of said non-return valve and another non-return valve in said duct delivering toward said first-mentioned non-return valve.

7. A suspension as in claim 6 further comprising a valve in the duct system connected to the column and a drain from the valve to the fluid supply.

8. A suspension as in claim 6 further comprising an accumulator connected to the duct system intermediate the column and supply and an adjustable relief valve draining the accumulator to the supply.

References Cited in the file of this patent

UNITED STATES PATENTS

| | | |
|---|---|---|
| 2,436,573 | Heynes | Feb. 24, 1948 |
| 2,554,581 | Levy | May 29, 1951 |